US010083466B1

(12) United States Patent
Chakraborty et al.

(10) Patent No.: US 10,083,466 B1
(45) Date of Patent: Sep. 25, 2018

(54) MOBILE APPLICATION AS AN INTELLIGENT AGENT WITH THE ABILITY TO LISTEN, PROCESS AND ACTION THE CUSTOMER'S VOICE/FEEDBACK

(71) Applicant: Bank of America Corporation, Charlotte, NC (US)

(72) Inventors: Pinak Chakraborty, Hyderabad (IN); Sandeep Kumar Chauhan, Hyderabad (IN); Vidhu Beohar, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/613,370

(22) Filed: Jun. 5, 2017

(51) Int. Cl.
*H04M 3/42* (2006.01)
*G06Q 30/02* (2012.01)
*G06Q 30/00* (2012.01)

(52) U.S. Cl.
CPC ....... *G06Q 30/0282* (2013.01); *G06Q 30/016* (2013.01)

(58) Field of Classification Search
CPC .................. G06Q 30/0282; G06Q 30/016
USPC ....................... 379/201.01, 203.01
See application file for complete search history.

(56) References Cited

U.S. PATENT DOCUMENTS

| 7,092,888 | B1 | 8/2006 | McCarthy et al. |
| 7,483,941 | B2 | 1/2009 | Carlson et al. |
| 7,500,149 | B2 | 3/2009 | Grieskamp et al. |
| 7,908,336 | B2 | 3/2011 | Carlson et al. |
| 8,767,948 | B1 | 7/2014 | Riahi et al. |
| 8,831,203 | B2 * | 9/2014 | Chang ................ H04M 3/5175 379/201.01 |
| 9,313,332 | B1 | 4/2016 | Kumar et al. |
| 9,386,152 | B2 | 7/2016 | Riahi et al. |
| 2015/0242930 | A1 * | 8/2015 | Greystoke .......... G06Q 30/0631 705/26.7 |

* cited by examiner

*Primary Examiner* — Quynh Nguyen
(74) *Attorney, Agent, or Firm* — Banner & Witcoff, Ltd.; Michael A. Springs

(57) ABSTRACT

A computing platform having at least one processor, a memory, and a communication interface may receive, via the communication interface, a first content stream containing status information associated with a customer session. Responsive to receiving the first content stream, the computing platform may generate a feedback request, which is transmitted via the communication interface to a remote client device, causing the feedback request to be displayed on the remote client device. The computing platform may receive, via the communication interface, a second content stream containing information received from the remote client device in response to the feedback request. Responsive to receiving the second content stream, the computing platform may generate and transmit advice via the communication interface to the remote client device, causing the advice to be displayed on the remote client device.

20 Claims, 4 Drawing Sheets

MOBILE APPLICATION AS AN INTELLIGENT AGENT WITH THE ABILITY TO LISTEN, PROCESS AND ACTION THE CUSTOMER'S VOICE/FEEDBACK

FIELD

Aspects of the embodiments relate to a database system that provides a technological advancement over existing database systems by selectively soliciting feedback from customers at appropriate times and directing the customer to any existing channels that may be beneficial to resolve a problem currently being experienced by the customer.

BACKGROUND

Despite a variety of social media and other channels being used for collecting customer feedback, there remain significant challenges with respect to receiving the requested feedback, processing the feedback, and appropriately acting on the feedback. Often feedback is requested via a questionnaire form. Many customers, however, dislike completing long questionnaires to communicate their experiences. Another problem can be that the population selected for and/or who choose to respond to a survey may not accurately reflect an actual customer population, thereby introducing bias in the results.

BRIEF SUMMARY

Aspects of the disclosure provide effective, efficient, scalable, and convenient technical solutions that address and overcome the technical problems associated with deploying computing infrastructure and providing user account portals. In particular, one or more aspects of the disclosure provide techniques for promptly identifying and resolving a variety of types of issues that may be encountered during a customer session.

In accordance with one or more embodiments, a computing platform having at least one processor, a memory, and a communication interface may receive, via the communication interface, a first content stream containing status information associated with a customer session. Responsive to receiving the first content stream, the computing platform may generate a feedback request and transmit the feedback request via the communication interface to a remote client device, causing the feedback request to display on the remote client device. The computing platform may receive, via the communication interface, a second content stream containing information received from the remote client device in response to the feedback request. Responsive to receiving the second content stream, the computing platform may generate and transmit advice via the communication interface to the remote client device, causing the advice to be displayed on the remote client device.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
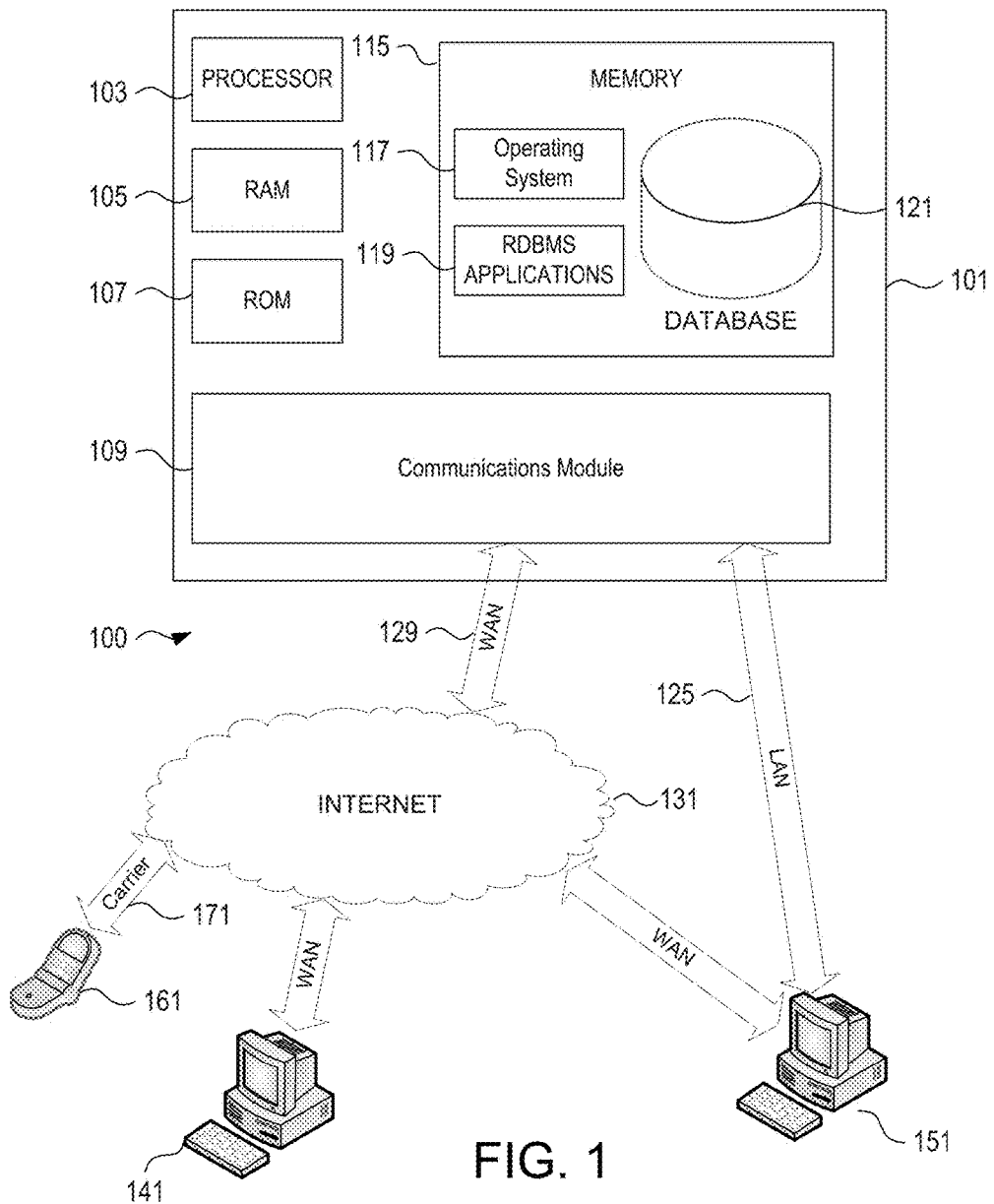
FIG. 1 illustrates an example of a suitable computing system environment that may be used according to one or more illustrative embodiments.

In the following description of the various embodiments, reference is made to the accompanying drawings, which form a part thereof, and in which is shown by way of illustration various embodiments in which the disclosure may be practiced. It is to be understood that other embodiments may be utilized and structural and functional modifications may be made without departing from the scope and spirit of the present disclosure.

It is noted that various connections between elements are discussed in the following description. It is noted that these connections are general and, unless specified otherwise, may be direct or indirect, wired or wireless, and that the specification is not intended to be limiting in this respect.

The features disclosed herein overcome one or more drawbacks in prior art database systems to provide a technological improvement. In one example, the accuracy of a customer feedback system, in terms of relevance to a matter at hand, is improved by automatically selecting topics that are pertinent to input received from the customer. In another example, the effectiveness of a customer feedback system is improved by automatically identifying appropriate times for soliciting customer feedback, such as when failure is encountered or when the transaction may have increased importance to the customer. In yet another example, the versatility of a customer feedback system is improved by automatically cataloging features that are not presently available to address a particular customer need, so as to help identify a need for new product features.

In accordance with one or more embodiments, a computing platform having at least one processor, a memory, and a communication interface may receive, via the communication interface, a first content stream containing status information associated with a customer session. In some aspects, the status information may include an indication that an attempted transaction was unsuccessful. In other aspects, the status information may include an indication that the customer may be frustrated due to the transaction having required an unusual number of steps or duration for its completion, for example the actual number of steps taken to complete a transaction exceeded a predetermined number of steps and/or the actual duration taken to complete a transaction exceeded a predetermined duration. In still other aspects, the status information may include an indication that the transaction may have sentimental value to the customer, such as due to its temporal proximity to a known special occasion.

The status information received from the remote client device may be gathered and analyzed for purposes of evaluating the feature or activity. In addition, responsive to receiving the first content stream, the computing platform may generate a feedback request and cause the feedback request to be transmitted to the remote client device. In some examples, the feedback request may be selected from a plurality of predetermined alternatives based on the content of the status information received. In other examples, the feedback request may be tailored by asking the customer relevant questions while collecting the feedback.

In accordance with one or more embodiments, the computing platform, responsive to receiving the first content stream associated with the customer session, via the communication interface, identifies an existing feature, generates an inquiry asking the customer whether he or she wishes to engage the existing feature, and causes the inquiry to be displayed on the remote client device. In the event that an existing feature is not available or one cannot be identified based on the information provided by the customer, the computing platform may automatically update a feature catalog to include information regarding the customer session. When a new feature relevant to the customer session is developed or in the process of development, the computing platform may automatically generate and transmit a communication to the customer (e.g., by e-mail, text message, or the like) to alert the customer to the new feature and/or to the progress of its development.

Aspects of the disclosure as described herein may provide a number of advantages over currently available technologies, including helping a service provider to better understand its customers and using customer feedback to identify potential new features for future development. In some aspects, a human-like feedback collection system is provided that allows customers to easily provide input in natural language. The collection system also may offer further improvements over existing technologies by identifying the best times to solicit customer feedback and automatically identifying potential customer frustration when an unusual number of steps or duration is taken to complete a transaction.

FIG. 1 illustrates an example of a suitable computing system environment 100 that may be used according to one or more illustrative embodiments. The computing system environment 100 may include a computing device 101 wherein the processes discussed herein may be implemented. The computing device 101 may have a processor 103 for controlling overall operation of the computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts to digital files.

Although not shown, RAM 105 may include one or more are applications representing the application data stored in RAM 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling the computing device 101 to perform various functions. For example, memory 115 may store software used by the computing device 101, such as an operating system 117, application programs 119, and an associated database 121. Also, some or all of the computer executable instructions for the computing device 101 may be embodied in hardware or firmware.

Computing device 101 may operate in a networked environment supporting connections to one or more remote computing devices, such as computing devices 141, 151, and 161. The computing devices 141, 151, and 161 may be personal computing devices or servers that include many or all of the elements described above relative to the computing device 101. Computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 may be connected to the LAN 125 through a network interface or adapter in the communications module 109. When used in a WAN networking environment, the computing device 101 may include a modem in the communications module 109 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 119 used by the computing device 101, according to an illustrative embodiment, may include computer executable instructions for invoking user functionality related to communication including, for example, email, short message service (SMS), and voice input and speech-recognition applications.

Embodiments of the disclosure may include forms of computer-readable media. Computer-readable media include any available media that can be accessed by a computing device 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 101. Such a processor may execute computer-executable instructions stored on a computer-readable medium.

Figure 2:
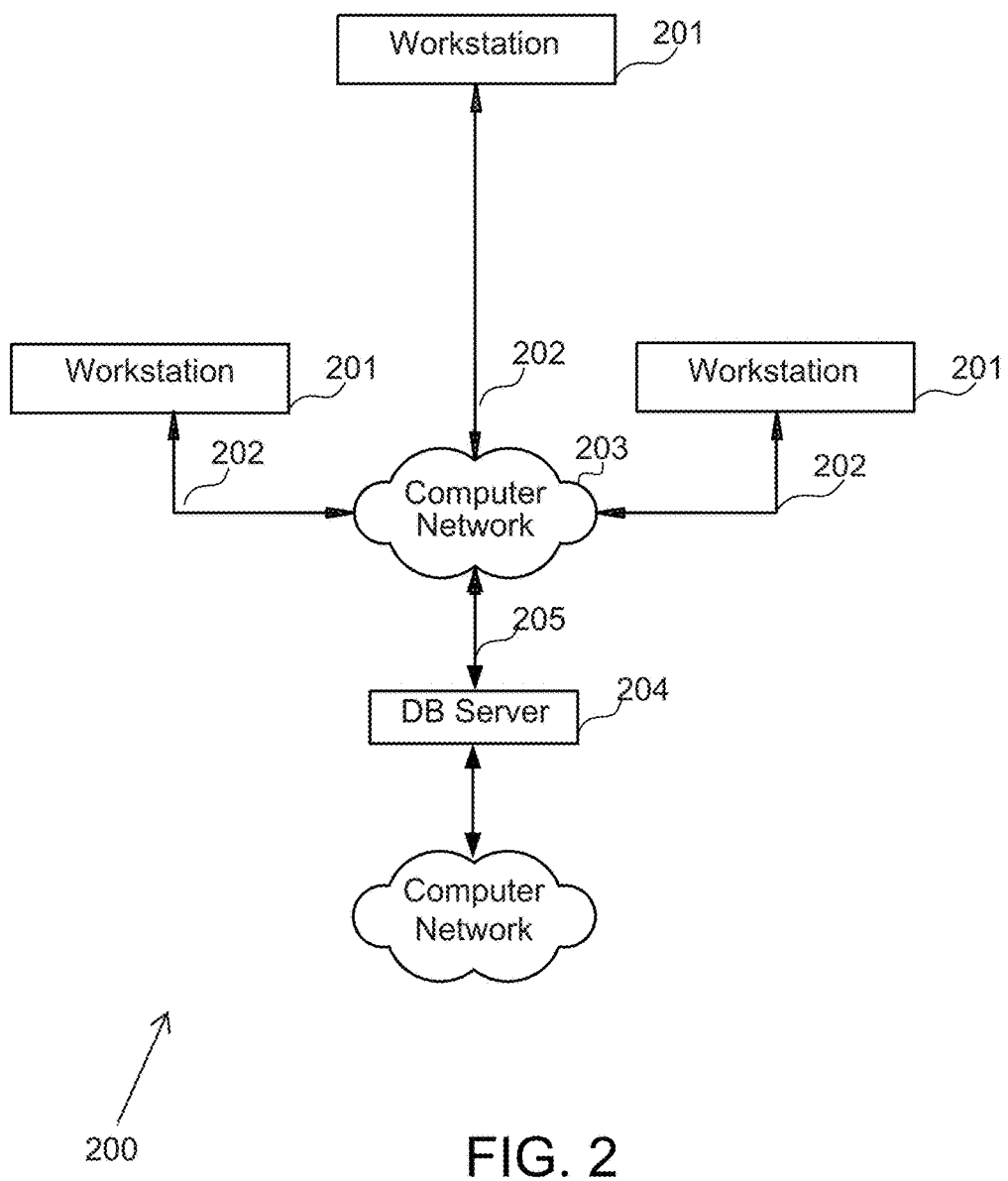
FIG. 2 shows an illustrative system for implementing example embodiments according to the present disclosure.

Referring to FIG. 2, an illustrative system 200 for implementing example embodiments according to the present disclosure is shown. As illustrated, system 200 may include one or more workstation computers 201. Workstations 201 may be local or remote, and may be connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants (clients).

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links.

Database servers may serve different types of databases, including a relational database, e.g., SQL database, object-oriented databases, linear databases, self-referential databases, and other types of databases. In some embodiments, the processes executing on a database administrator's computer may support a graphical user interface (GUI) that provides on a database (DB) administrator's desktop a near real-time view of multiple SQL server instances. Because, in those embodiments, monitoring configuration is not required on a SQL server, the GUI tool may appear to be essentially instantaneous to the DB administrator so that any newly built SQL server can be viewed without having to prepare the server from monitoring standpoint (e.g., to provide a plug-and-play like functionality).

Information about the SQL Server status may be presented in a graphical user interface (GUI) format where status information for all of the listed database servers is presented in one integrated view in an automated manner. A monitoring process may read a list of SQL Server Instances from a designated Server detail repository (in form of a database) of organization or from a flat text input file and then connects to each listed SQL server to query the System Catalogs of the SQL Server engine. Because the monitoring process runs from a central server, configuration demand at the SQL server's side is circumvented. The monitoring process interprets the received information from the SQL servers and updates the GUI. By monitoring and obtaining additional information about SQL features for specified servers through the GUI, the database administrator or any other user (or self-learning analytics engine) may then report and/or fix detected issues. The processes may use a 32-bit operating system, thus circumventing a complicated monitoring infrastructure that demands extra skill sets and significant cost with infrastructure dependency.

Figure 3:
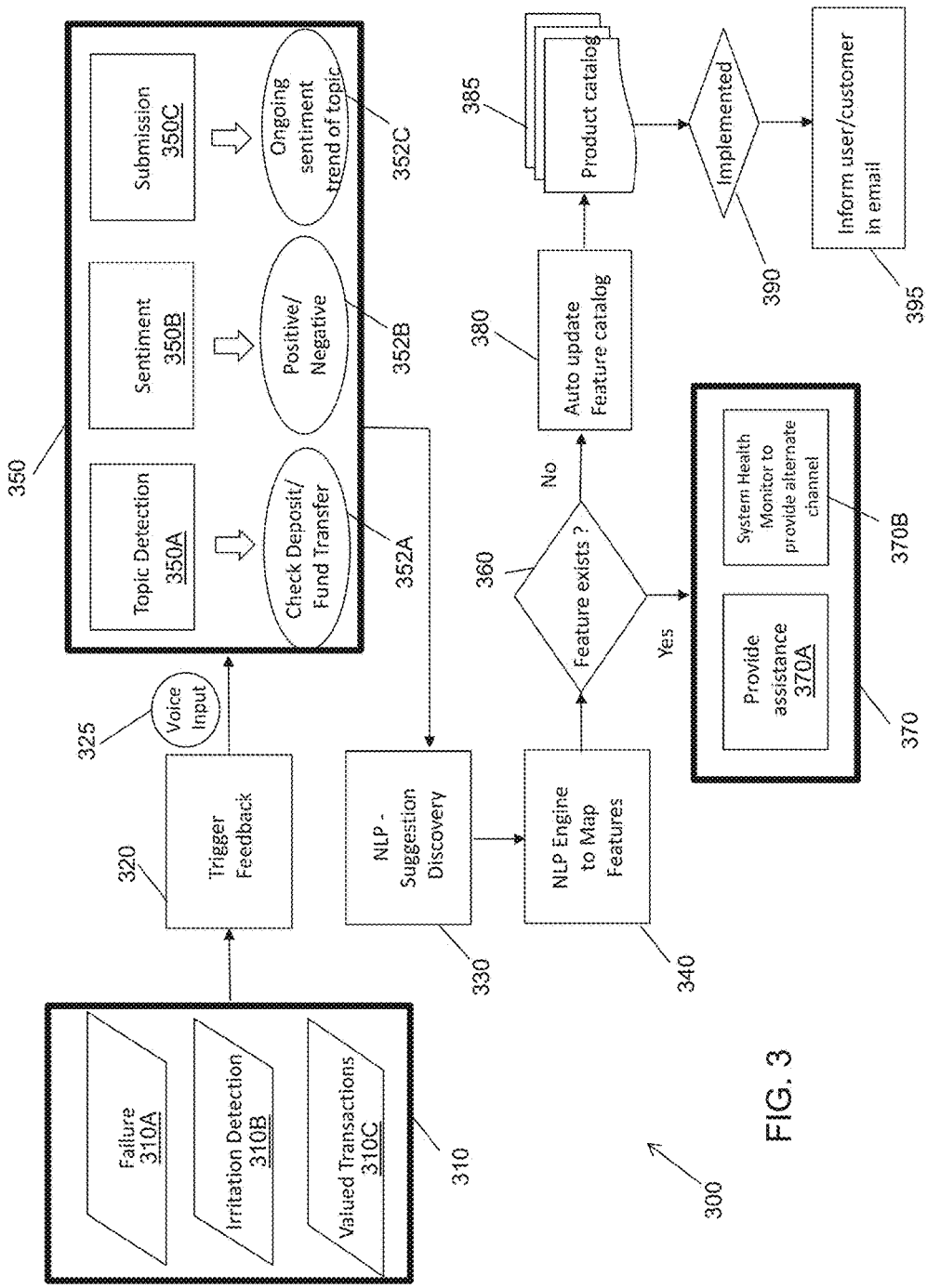
FIG. 3 shows an illustrative event sequence for implementing and using a data processing system to provide automated collaboration assistance functions in accordance with one or more example embodiments.
Figure 4:
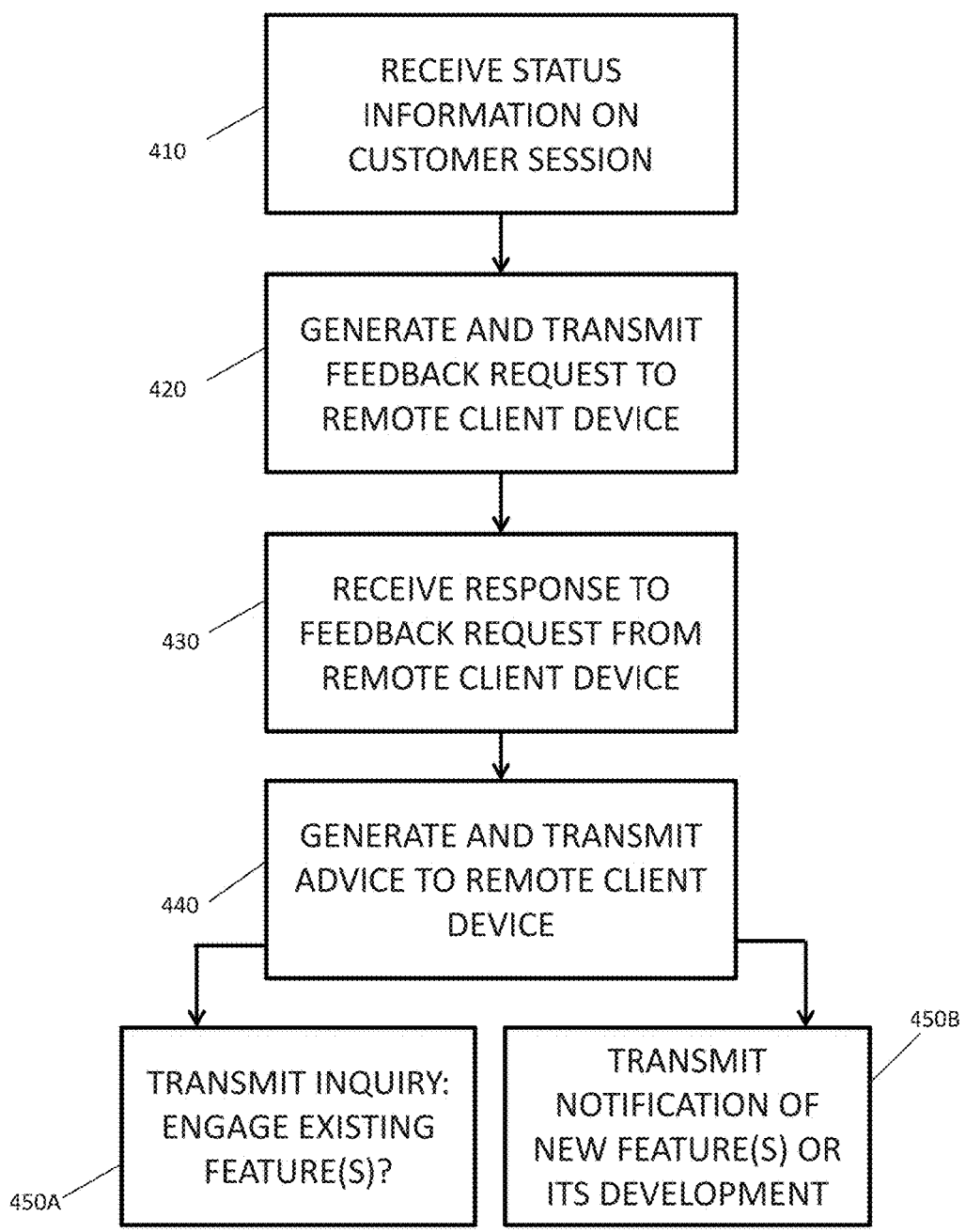
FIG. 4 depicts a method of collecting and processing customer feedback in accordance with one or more example embodiments.

The various steps that follow in the discussion of FIGS. 3 and 4 may be implemented by one or more of the components in FIGS. 1 and 2 and/or other components, including other computing devices.

FIG. 3 shows an illustrative event sequence 300 for implementing and using a data processing system to provide automated collaboration assistance functions in accordance with one or more example embodiments. A variety of preset criteria 310 are used to trigger a feedback request 320 during a customer session. For example, the feedback request 320 may be triggered by failure detection 310A, such as in the event the customer begins an activity but is unable to complete it successfully. Another example of a preset criteria is irritation detection 310B, which may be a situation in which the customer completes an activity, but in a greater number of steps or duration of time than normally would be expected. For example, if an successful activity "A" normally follows the route "Event 'a'→Event 'b'→Event 'c'→Event 'd,'" the computing platform may track the route that the customer actually follows to complete activity A. If the actual route taken is not similar to the defined route, and/or the customer remains stuck in the same event for a period of time, the customer may become irritated or frustrated. Upon the computing platform detecting such an event 310B, the computing platform may automatically request feedback 320 from the customer to determine if he or she needs assistance in completing the task, and/or solicit input with regard to possible improvements with respect to the activity that presented difficulties to that customer.

A feedback request also may be triggered based on valued transactions 310C. Consumer sessions occurring in temporal proximity to special occasions associated with gift-giving, e.g., Christmas, Valentine's Day, Mother's Day, Father's Day, or the like, may have sentimental value as the transaction may be for the benefit of a loved one. Valued transactions 310C also may include events that are known by the host to attract negative consequences such as customer attrition or product/service agreement cancellation. It is contemplated that a timely feedback request, particularly if coupled with an instant response to the customer, in some instances may help to retain a customer's business.

Voice feedback 325 received from the customer may be converted into text to aid further processing. As schematically shown as item 350, text classification techniques may be used to identify the topic/feature and any associated sentiment with a particular customer feedback. The initial gathering of feedback may include identifying the topic 350A and the particular activity or type of transaction 352A (check deposit, fund transfer, or the like). This step also may include identifying whether the transaction involved customer sentiment 350B and, if so, whether the customer's response was positive or negative 352B. Any customer comments or other submissions 350C may be collected and analyzed for trends 352C, for example to help gauge initial customer response to a new feature offered. A trend graph may be developed to help quantify the sentiment trends of a particular feature.

Once the feedback is collected and sorted, it then may be processed to determine an appropriate next course of action to assist the customer. A natural language processing (NLP) system 330 may be used for suggestion discovery, such as is described in co-pending application Ser. No. 15/355,810, filed Nov. 18, 2016, entitled "Network Security Database Sorting Tool," the disclosure of which is hereby incorporated by reference in its entirety. The NPL processing system basically involves identifying and prioritizing keywords to help decipher a particular verbal response. This step may involve a "handshake" during which the customer is asked to confirm that his or her feedback relates to the topic identified by the NPL processing system. In the case of a "no" response, the customer may be prompted to rephrase the response to better articulate the particular topic or issue of concern.

A NLP engine 340 may be used to map a customer response with any available features of the system that are associated with the particular topic or issue that was identified by the NPL processing system 330. At step 360, an inquiry is made as to whether any existing system feature corresponds to the particular topic or issue that was identified. If this inquiry is answered in the affirmative, the customer may be asked whether he or she would like to use the existing feature at step 370A. If, on the other hand, the inquiry is answered in the negative, the topic or issue that was identified may be automatically added to a feature catalog 380 for later review. When, for example, customer responses received over a period of time indicate the need for a new feature, the feature may be added to a product catalogue 385 for further review. If and when the new feature is implemented (step 390), the customer may be automatically notified by e-mail, text message, or other suitable medium (step 395) that the new feature is available. The customer also may be given a notification that a relevant new feature is under development and/or is expected to become available at a future date.

A system health monitor 370B may be used to check the system health and alert the customer if, for example, a failed transaction was the result of ill system health. The system health monitor 370B may automatically send a message to the customer once the technical issue plaguing system health is resolved. The system health monitor 370B also may automatically direct the customer to an alternative channel (mobile application, website, etc.) that may be used to complete the transaction by other means not effected by the ill system health.

FIG. 4 depicts an illustrative method for receiving status information for a customer session and transmitting advice to a remote client device for display in accordance with one or more example embodiments. At step 410, a computing platform receives, via the communication interface, a first content stream containing status information associated with a customer session. At step 420, responsive to receiving the first content stream, the computing platform generates and transmits a feedback request via the communication interface to a remote client device for display thereon. At step 430, the computing platform receives a second content stream containing information received from the remote client device in response to the feedback request. At step 440, responsive to receiving the second content stream, the computing platform generates and transmits advice to the remote client device for display thereon. If there is an existing feature or features available, the computing platform may generate and transmit an inquiry 450A asking whether the customer wishes to engage the existing feature or features. If no existing features are identified, the computing platform may transmit a notification 450B upon a new feature becoming available or as an update to the development of a new feature.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

We claim:

1. A computing platform, comprising:
   at least one processor;
   a communication interface communicatively coupled to the at least one processor; and
   memory storing computer-readable instructions that, when executed by the at least one processor, cause the computing platform to:
   receive, via the communication interface, a first content stream containing status information associated with a customer session;
   responsive to receiving the first content stream, generate and transmit a feedback request via the communication interface to a remote client device, causing the feedback request to display on the remote client device;
   receive, via the communication interface, a second content stream containing information received from the remote client device in response to the feedback request; and
   responsive to receiving the second content stream, generate and transmit advice via the communication interface to the remote client device, causing the advice to be displayed on the remote client device.

2. The computing platform of claim 1, wherein the first content stream includes status information indicating that an attempted transaction was unsuccessful, that a transaction required more than a predetermined number of steps or duration for completion, that a transaction occurred within a predetermined proximity to a specified date, or a combination thereof.

3. The computing platform of claim 1, wherein the feedback request display includes a plurality of predetermined alternatives.

4. The computing platform of claim 1, wherein the feedback request is generated upon the computing platform receiving one or more intermediate inquiry responses from the remote client device.

5. The computing platform of claim 1, wherein the advice includes an identification of one or more existing features.

6. The computing platform of claim 5, wherein the computer-readable instructions, when executed by the at least one processor, cause the computing platform to generate and transmit an inquiry, via the communication interface, of whether the customer wishes to engage the existing feature or features, causing the inquiry to be displayed on the remote client device.

7. The computing platform of claim 1, wherein the advice includes an indication that a new feature is under development or is scheduled for future development.

8. The computing platform of claim 7, wherein the computer-readable instructions, when executed by the at least one processor, cause the computing platform to generate and transmit, via the communication interface, an update pertaining to the availability of the new feature or to the development thereof, causing the update to be displayed on the remote client device.

9. A method, comprising:
at a computing platform comprising at least one processor, memory, and a communication interface:
receiving, by the at least one processor, via the communication interface, from a content management system, a first content stream containing status information associated with a customer session;
responsive to receiving the first content stream, generating and transmitting a feedback request via the communication interface to a remote client device, causing the feedback request to display on the remote client device;
receiving, via the communication interface, a second content stream containing information received from the remote client device in response to the feedback request; and
responsive to receiving the second content stream, generating and transmitting advice via the communication interface to the remote client device, causing the advice to be displayed on the remote client device.

10. The method of claim 9, wherein the first content stream includes status information indicating that an attempted transaction was unsuccessful, that a transaction required more than a predetermined number of steps or duration for completion, that a transaction occurred within a predetermined proximity to a specified date, or a combination thereof.

11. The method of claim 9, wherein the feedback request display includes a plurality of predetermined alternatives.

12. The method of claim 9, wherein the feedback request is generated upon the computing platform receiving one or more intermediate inquiry responses from the remote client device.

13. The method of claim 9, wherein the advice includes an identification of one or more existing features.

14. The method of claim 13, further comprising generating and transmitting an inquiry, via the communication interface, of whether the customer wishes to engage the existing feature or features, causing the inquiry to be displayed on the remote client device.

15. The method of claim 9, wherein the advice includes an indication that a new feature is under development or is scheduled for future development.

16. The method of claim 15, further comprising generating and transmitting, via the communication interface, an update pertaining to the availability of the new feature or to the development thereof, causing the update to be displayed on the remote client device.

17. One or more non-transitory computer-readable media storing instructions that, when executed by a computing platform comprising at least one processor, memory, and a communication interface, cause the computing platform to:
receive, via the communication interface, a first content stream containing status information associated with a customer session;
responsive to receiving the first content stream, generate and transmit a feedback request via the communication interface to a remote client device, causing the feedback request to display on the remote client device;
receive, via the communication interface, a second content stream containing information received from the remote client device in response to the feedback request; and
responsive to receiving the second content stream, generate and transmit advice via the communication interface to the remote client device, causing the advice to be displayed on the remote client device.

18. The non-transitory computer-readable media of claim 17, wherein the feedback request is generated upon the computing platform receiving one or more intermediate inquiry responses from the remote client device.

19. The non-transitory computer-readable media of claim 17, wherein the computer-readable instructions, when executed by the at least one processor, cause the computing platform to generate and transmit an inquiry, via the communication interface, of whether the customer wishes to engage an existing feature or features, causing the inquiry to be displayed on the remote client device.

20. The non-transitory computer-readable media of claim 17, wherein the computer-readable instructions, when executed by the at least one processor, cause the computing platform to generate and transmit, via the communication interface, an update pertaining to the availability of a new feature or to the development thereof, causing the update to be displayed on the remote client device.

* * * * *